3,288,647
FUEL BATTERY AND METHOD OF
OPERATING SAME
Michel Beigelman, Villiers-Adam, and André Salvadori, Paris, France, assignors to Service National dit: Gaz de France, Paris, France
Filed Sept. 7, 1962, Ser. No. 222,088
Claims priority, application France, Sept. 14, 1961, 873,177, Patent 1,307,956
7 Claims. (Cl. 136—86)

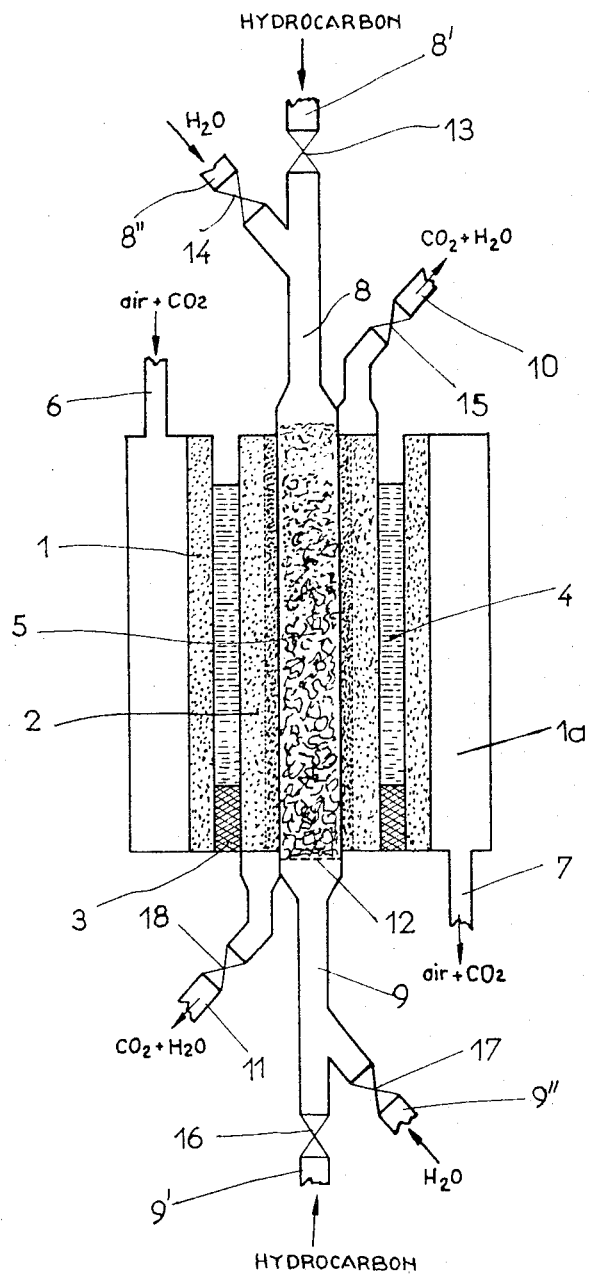

This invention relates essentially to devices for generating electric current, of the chemico-electrical type, constituting a so-called fuel battery, and also to a method of operating this battery.

A great number of fuel batteries are already known which permit the transforming of chemical energy directly into electrical energy. However, considerable difficulties arise when commercial fuels deriving from the production of gas (such as town gas, coke-oven gas, etc.), or petroleum gases (natural gases, gaseous and liquid hydrocarbons, etc.) are used.

It is the object of this invention to provide a fuel battery which permits:

Utilizing any desired gaseous or vaporized hydrocarbon;
Recovering and evacuating the lost or excess heat from the oxidation reactions of the battery;
Ensuring a rational elimination of the oxidation products;
Avoiding the clogging of the pores in the fuel electrode by the carbon resulting necessarily from the thermal cracking of the hydrocarbons before they contact the catalytic portion of the electrode.

The fuel battery according to this invention comprises at least two hollow porous electrodes, that is, a combustion-agent electrode and a fuel electrode, these electrodes being preferably of tubular configuration and disposed concentrically with respect to each other, the combustion-agent electrode surrounding the fuel electrode. An electrolyte is disposed in the annular space between the two electrodes, the battery also comprising a catalyst known per se. The battery according to this invention is characterized in that the aforesaid central fuel electrode contains in its inner space the catalytic substance and at each one of its opposite ends respectively on the one hand an inlet pipe or duct, preferably of the fork or two branch type, adapted to feed said inner space with a mixture of a fluid fuel and an adjuvant fluid, and on the other hand an outlet pipe or duct adapted to discharge oxidation products or fumes, this dual pipe or duct system permitting a periodic reversal of the direction of flow of the fluids.

According to another feature of this invention each pipe or pipe branch associated with said central electrode comprises means, such as a valve or the like, for discontinuing or stopping the fluid flow.

This invention is also concerned with a method of operating a fuel battery of the type broadly set forth hereinabove, which is characterized notably in that said fuel electrode is fed with a mixture of gaseous or vaporized hydrocarbon and water steam, the steam content of said mixture being so selected that the reaction products consist only of hydrogen, carbon monoxide and small quantities of carbon dioxide and methane.

According to another feature of this invention, said combustion-agent electrode is fed preferably with air to which one portion of said carbon dioxide is added in case an electrolyte consisting basically of molten carbonates is used.

According to a further feature of this invention the length of said fuel electrode and the output of said mixture are so selected that said hydrogen and carbon monoxide can flow through the porous wall of said electrode, the absence of these products being checked in the exhaust fumes.

It is another feature of this invention to reverse simultaneously and at predetermined time intervals the direction of flow of the fuel mixture fed to said fuel electrode, on the one hand, and of the evacuated combustion products, on the other hand.

Other features and advantages of this invention will appear from the following description with reference to the accompanying drawing of which the single figure illustrates diagramatically by way of example a typical embodiment of a fuel battery according to this invention.

In the embodiment illustrated the reference numeral 1 designates the hollow combustion-agent electrode, preferably of cylindrical configuration. The electrode 1 surrounds a fuel electrode 2 also hollow and cylindrical, which is disposed concentrically with respect to the central electrode 1. The annular space provided between the two electrodes is filled with an electrolyte 4 in a liquid state, and is closed at its lower end by an annular plug 3 preferably of insulating and acid-proof material, and consisting for example of a solidified fraction of the eletctrolyte. The combustion-agent electrode 1 is porous, pervious to gases but impervious to the electrolyte, said electrode 1 forming the inner side wall of a cylindrical annular space 1a provided for the combustion-agent fluid. The walls of the fuel electrode 2 are also porous, pervious to gases but impervious to the electrolyte and it may consist of at least two concentric layers having different porosities. The space or cavity within the fuel electrode 2 is filled with a catalytic substance 5.

The annular space 1a is coupled to an inlet pipe or duct 6 for introducing the combustion-agent and another opposite pipe or duct 7 for discharging this agent.

The fuel electrode 2 may be fed with a mixture of a fluid fuel and an adjuvant fluid alternately in two opposite directions of flow. To this end, the electrode 2 is coupled at each one of its opposite ends to an inlet pipe or duct 8, 9 for the mixture, and an exhaust pipe or duct 10, 11 for the burnt gases. Each inlet pipe may advantageously consist of a forked pipe comprising two branches, namely one branch 8' or 9' for introducing the fluid fuel, and another branch 8" or 9" for introducing the adjuvant fluid.

In the case of a vertical arrangement, it is advantageous to provide a strainer, filter or other equivalent means 12 for supporting the catalyst 5 at the upper portion of the fuel electrode 2 without interfering with the flow of fluids.

Each one of said pipes or branches comprises a device for stopping or controlling the flow of fluid, for example in the form of a valve or the like, shown diagrammatically at 13, 14, 15, 16, 17 and 18 respectively. By properly controlling these valves according to a well-defined cycle of operation it is possible to reverse simultaneously and periodically the direction of flow of the fluids through the fuel electrode 2, or to allow only the adjuvant fluid to flow in alternate directions.

The catalyst 5 consists preferably of nickel-impregnated silico-aluminous grains.

The length of the fuel electrode 2 is such that a complete diffusion of the gas can take place through the porous wall.

The method of operating the fuel battery is based on the following principle:

The gaseous hydrocarbon (which may also be brought beforehand to a vapor state) is directed together with a suitably metered quantity of steam onto the catalytic mass 5 disposed inside the fuel electrode 2. The steam content of the reaction mixture is so selected that the reaction products consist exclusively of hydrogen, carbon monoxide and small amounts of methane and carbon dioxide. This reaction, during which the hydrocarbons undergo a cracking and steam reforming process is endothermic and absorbs heat at the level of the fuel electrode. The methane content of the fuel gas, which remains less than 10%, is not sufficient to cause free carbon to be released, thus implying the possibility of clogging the pores of the fuel electrode.

The combustion products of the battery are then carbon dioxide and steam. One portion of the carbon dioxide is added to the air delivered to the combustion-agent electrode when molten carbonate electrolytes are used.

The length of the fuel electrode and the output of reaction mixture are so selected that hydrogen and carbon monoxide, which are readily diffused, can pass through the porous wall. The absence of these products is checked in the exhaust fumes.

As the fuel mixture is leaner as it moves axially in the electrode, the upstream portions of the electrode which are near the fuel flow inlet are more active than the portions located further downstream. To avoid this drawback the directions of feed and exhaust of the fluids with respect to the fuel electrode are reversed simultaneously and according to a well-defined periodic relation. Two alternative successive flow phases (an ascending phase or up-run and a descending phase or down-run) are separated by two short purge steps affected by using blown steam, in order to avoid any loss of hydrocarbon.

The cycle of operation is obtained by opening and closing the aforesaid valve means at spaced time intervals; the proper sequence is set forth in the following table:

|  | Open valves | Closed valves |
| --- | --- | --- |
| Ascending Phase (up-run): |  |  |
| Generation | 13-14-18 | 16-17-15 |
| Steam purge | 14-18 | 13-16-17-15 |
| Descending Phase (down-run): |  |  |
| Generation | 16-17-15 | 13-14-18 |
| Steam purge | 17-15 | 16-13-14-18 |

During the purge period steam is blown for only a few seconds and the generation of electric current is not disturbed, for the hydrogen and carbon monoxide occluded in the fuel electrode 2 are not swept by the steam.

According to a preferred form of embodiment of this invention the chemical composition of the fuel electrode and of the combustion-agent electrode may be of the type described in the French patent application Serial No. 873.042 filed on September 12, 1961, now Patent 1,307,-953, entitled: "Fuel Battery Operating at High Temperatures."

By way of example, in natural-gas batteries the equimolecular mixture of methane and steam produces the following reaction when contacting the catalyst:

$$CH_4 + H_2O \rightarrow CO + 3H_2$$

The reaction products are oxidized electro-chemically on the fuel electrode 2 and the combustion products $CO_2 + 3H_2O$ escape either through the pipe 10 or through the opposite pipe 11, according to the direction of flow of the phase.

With a battery according to this invention a voltage of 1.10/volts with a short-circuit current density of 200 ma/sq. cm. is obtained, the corresponding figures in closed-circuit condition being 0.750 volt and 100 ma./sq. cm. respectively.

Although the present invention has been described in conjunction with a preferred embodiment, it is to be understood that modifications and variations may be resorted to without departing from the scope of the invention, as those skilled in the art will readily understand.

What we claim is:
1. A fuel battery adapted to operate with gaseous hydrocarbons, comprising an outer tubular porous combustion-agent electrode having combustion-agent duct means connected thereto, a central tubular porous fuel electrode having an inner space and two opposite ends, an annular space between said combustion-agent electrode and said fuel electrode, liquid electrolyte disposed within said annular space, steam cracking catalytic substance of said hydrocarbons in said inner space of said tubular fuel electrode, feeding duct means for fuel fluid and adjuvant fluid of the two-branch fork type connected to either of said opposite ends of said inner space of tubular fuel electrode, valve means disposed on said feeding duct means, discharging duct means for the oxidation products and fumes connected to either of said opposite ends of said fuel electrode and valve means disposed on said discharging duct means.

2. A fuel battery as claimed in claim 1, wherein said annular space containing said liquid electrolyte is closed at its lower end by an annular plug of insulating and acid-proof material.

3. A fuel battery as claimed in claim 1, wherein said annular space containing said liquid electrolyte is closed at its lower end by an annular plug made of a solidified fraction of said liquid electrolyte.

4. A method of generating electric current by using a fuel battery comprising the steps of supplying air to an outer tubular porous combustion-agent electrode, supplying a mixture of gaseous hydrocarbons and steam alternately in two opposite directions of flow through the inner space of a central tubular porous fuel electrode filled with a cracking catalytic substance and recovering the products of the combustion thereof successively and alternately at the opposite ends of said fuel electrode.

5. A method as claimed in claim 4, wherein between two successive reversing and supplying operations the aforesaid fuel electrode is cleaned by blowing steam therethrough during a short time period.

6. A method as claimed in claim 4, wherein the electrolyte is a molten carbonate, said combustion-agent electrode being fed with air to which one fraction of carbon dioxide produced by the reaction of combustion is added.

7. A method as claimed in claim 4, wherein the length of said fuel electrode and the output of said mixture are such that hydrogen and carbon monoxide produced by said cracking in the inner space of the fuel electrode can pass through the porous wall of said fuel electrode, the absence of these products being checked at the outlet.

References Cited by the Examiner

UNITED STATES PATENTS

| 1,124,347 | 1/1915 | Snelling. | |
| 1,182,759 | 5/1916 | Emanuel | 136—86 |
| 2,914,596 | 11/1959 | Gorin et al. | 136—86 |
| 3,134,697 | 5/1964 | Niedrach | 136—86 |
| 3,146,131 | 8/1964 | Linden et al. | 136—86 |

FOREIGN PATENTS

| 233,847 | 5/1961 | Australia. |
| 806,592 | 12/1958 | Great Britain. |

WINSTON A. DOUGLAS, *Primary Examiner.*

ALLEN B. CURTIS, *Examiner.*